United States Patent [19]

Nakano et al.

[11] 4,011,024
[45] Mar. 8, 1977

[54] DRILLING MACHINE

[75] Inventors: Gregory Nakano, Pearl City; Stephen Orillo, Jr., Wahiawa; Tadao Uyetake, Pearl City; Teikichi Higa, Honolulu, all of Hawaii

[73] Assignee: The United States of America as represented by the Secretary of the Navy, Washington, D.C.

[22] Filed: Feb. 4, 1976

[21] Appl. No.: 655,182

[52] U.S. Cl. .............................. 408/79; 408/111; 408/712

[51] Int. Cl.² ...................................... B23B 45/14

[58] Field of Search ............. 408/80, 712, 79, 136, 408/100, 101, 115 R, 111, 115 B

[56] References Cited

UNITED STATES PATENTS

| | | | |
|---|---|---|---|
| 1,584,071 | 5/1926 | Arnold | 408/101 |
| 2,040,273 | 5/1936 | Rottler | 408/79 X |
| 2,825,143 | 3/1958 | Polivka | 408/79 X |
| 2,911,860 | 11/1959 | Winslow et al. | 408/79 |
| 3,069,934 | 12/1962 | Lunsford | 408/79 |
| 3,635,570 | 1/1972 | DeGelleke et al. | 408/79 X |
| 3,663,115 | 5/1972 | Vindez et al. | 408/79 |
| 3,810,710 | 5/1974 | Ennemoser | 408/712 |
| 3,830,585 | 8/1974 | Nakada et al. | 408/79 |

FOREIGN PATENTS OR APPLICATIONS 1,206,268  12/1965  Germany .......................... 408/712

*Primary Examiner*—Francis S. Husar
*Assistant Examiner*—William R. Briggs
*Attorney, Agent, or Firm*—Richard S. Sciascia; Ervin F. Johnston; Thomas Glenn Keough

[57] ABSTRACT

Properly aligned threaded or smooth bores are machined in a pipe boss flange without requiring supplementary staging or makeshift rigs. An expandable holding sleeve is inserted in the throat of the pipe and a mounting unit is brought to rest on the outer surface of the pipe boss flange. A holding sleeve is expanded to engage the pipe and a bracket grips a projection from the mounting unit at a predetermined angular rotation while an extension of the bracket ensures a perpendicular orientation. A vertical feed mechanism mounted on the bracket directs a motor driven drill assembly through holes located in the mounting plate. After the holes and threads are machined in the pipe boss flange, the expandable sleeve is loosened and the unit is removed at a minimal time and effort expenditure.

5 Claims, 7 Drawing Figures

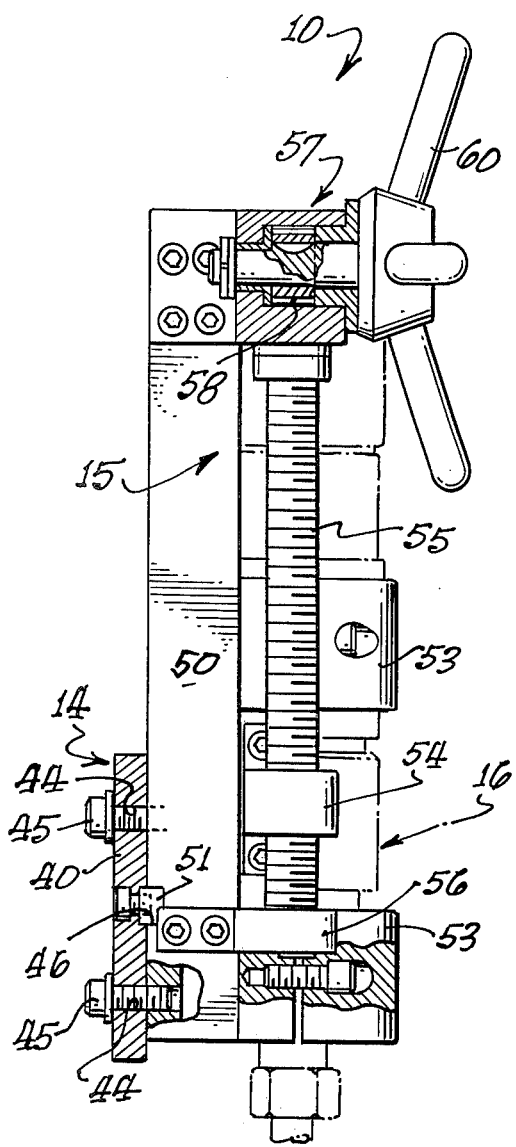
_FIG. 3._
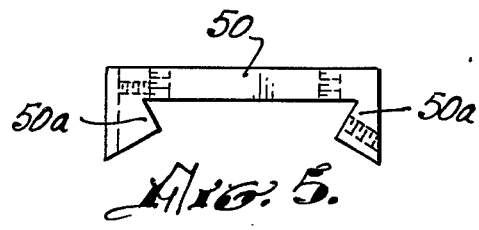
_FIG. 5._
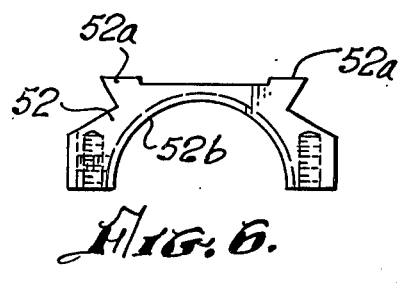
_FIG. 6._
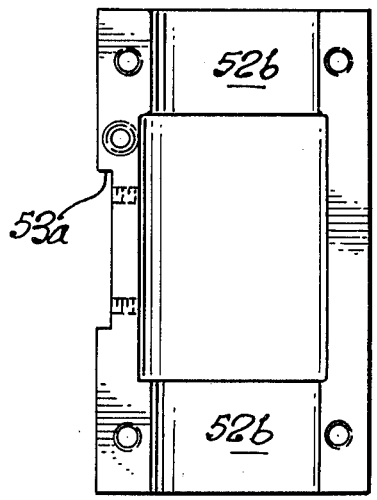
_FIG. 7._

DRILLING MACHINE

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

Surface and undersea craft as well as shore installations using heavy duty machinery have a complicated network of heavy duty pipes and fittings. It is common to join successive links of pipe and elbows etc. by bolts extending through pipe boss flanges of successive sections. Since liquids and gases are fed through the piping sections the interconnections must be sealed and properly aligned. During the fabrication of new interconnections and the refurbishment of existing connections the holes through which the bolts extend must be properly aligned. Usually this calls for providing elaborate support guides or make shift rigs to guide a standard portable power drill. Particularly, with large surface and undersea craft staging having heavy duty platforms usually need be erected to provide a mounting surface for the support guides and makeshift rigs. The time, materials and other cost factors incurred while erecting the staging and other supportive measures often far exceed the actual work requirements. Heretofore, such expenses were an unavoidable burden that had to be borne when massive pipe boss flanges were located at critical elevations or at precarious locations. There is a continuing need in the state-of-the-art, therefore, for a machine which will drill and tap new and refurbish existing tapped and untapped pipe flange bolt holes which is self-aligning and which doesn't require time consuming and costly supporting structures.

SUMMARY OF THE INVENTION

The present invention is directed to providing an apparatus for drilling holes in pipe boss flanges. A means is shaped for abutting the surface of the pipe boss flange and has a plurality of openings extending therethrough. An expanding means connected to the abutting means is sized to fit within the pipe and is expanded when inserted in the pipe to secure the abutting means in place. An engaging means is rotably carried on the abutting means and is provided with an extension for maintaining a perpendicular attitude. An effecting means is mounted on the engaging means and has a capability for making perpendicular and parallel displacements with respect to the surface of the pipe boss flange. A means mounted on the effecting means bores aligned holes in the pipe boss flange after the engaging means and the effecting means have aligned the boring means with the openings in the abutting means.

It is an object of the invention to provide an improved drilling apparatus for pipe boss flanges.

It is another object of the invention to provide a drilling apparatus requiring no supplementary support guide or makeshift rig.

Another object of the invention is to provide a drilling apparatus which reduces preoperational occupations.

Still another object is to provide a drilling apparatus which is portable and therefore capable of functioning at critical elevations and at precarious locations.

Still another object of the invention is to provide a drilling apparatus which grealy reduces the cost and personnel requirements for making aligned bores in pipe boss flanges.

A further object is to provide a drilling apparatus having a self-alignment capability for close concentricity, perpendicularity and parallelity Yet a further object of the invention is to provide a drilling apparatus which grealy simplifies alignment of bolt holes and thereby expedites the fastening of sections of pipe together.

Another object is to provide a drilling apparatus employing an expandable holding sleeve and mounting unit which stabilize and maintain a motor driven drill assembly to required machining tolerances.

These and other objects of the invention will become more readily apparent from the ensuing description when taken with the drawings.

BRIEF DESCRIPTION OF THE DRAWINGS

FIG. 3 is a side view of the invention taken generally along lines 3—3 in FIG. 1.

FIG. 5 is a top view of the saddle.

FIG. 6 is a top view of the slide.

FIG. 7 is a frontal view of the slide member.

DESCRIPTION OF THE PREFERRED EMBODIMENT

Figure 1:
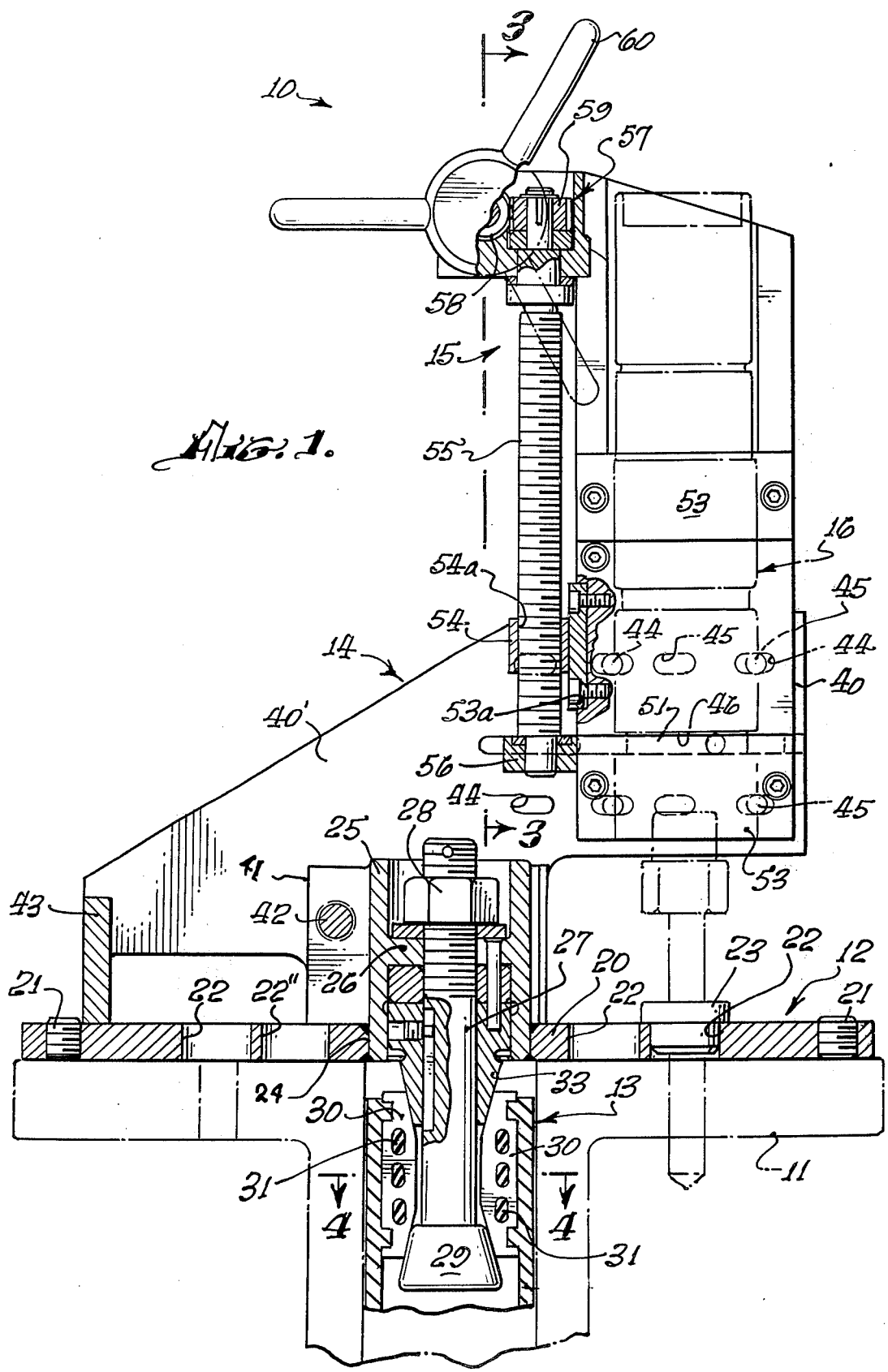
FIG. 1 is a side view of the invention shown partially in cross section.
Figure 2:
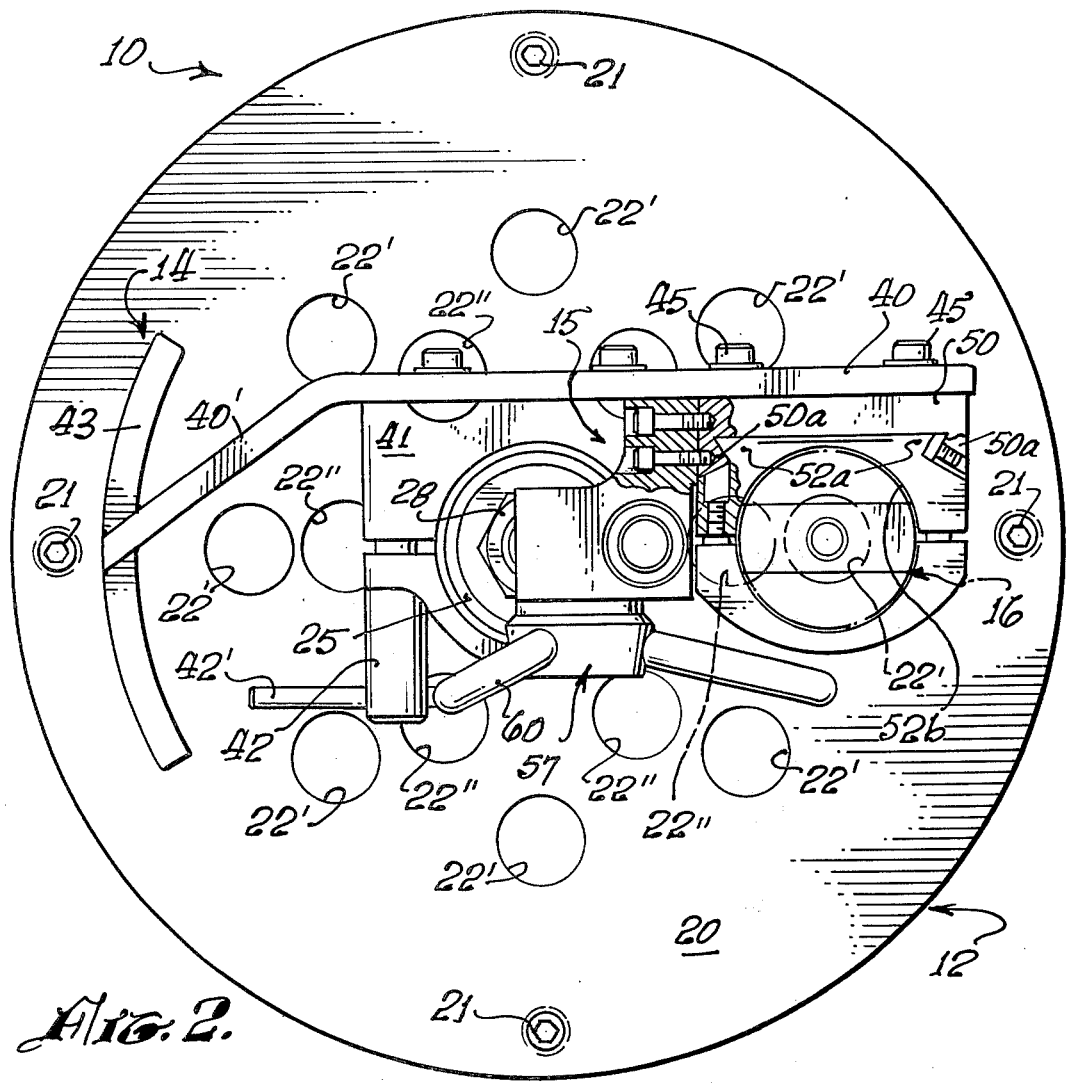
FIG. 2 is a top view of the invention.

Referring now to the drawings, there is shown a representative embodiment of a drilling machine 10 resting on a pipe boss flange 11. The machine has been specifically designed to do away with additional jigs, staging and other supportive equipment heretofore required for positioning a conventional drill in an aligned relationship to a pipe boss flange. Five major units mechanically coact to ensure a properly aligned boring and threading of holes in the flanges. These units are a mounting unit 12, an expandable holding sleeve unit 13, a rotatable bracket 14, a vertical feed and traverse mechanism 15 and a driven unit 16.

The interrelated coaction among these five units reduces the problems attendant the boring and refurbishing of flanges. The means by which this is accomplished will now be discussed in full detail.

Mounting unit 12, otherwise referred to as an abutting means, includes as a principal element, a disk-shaped mounting plate 20. Four set screws 21 are carried in threaded holes. Since they are orthogonally disposed about the periphery of the mounting plate, precise leveling and orientation with respect to the exposed surface of a pipe boss flange becomes a simple matter. All that needs to be done is to screw them inwardly or outwardly causing a greater or lesser force to be exerted on the surface of the flange.

A number of drill guide holes 22' and 22" are provided in the mounting plate and each contains a bushing 23. The guide holes and bushings help align a cutting tool as it makes its way to and through the flange. Although the structural components to be elaborated on below do in fact align themselves properly to a degree with respect to the flange, the bushings and guide holes ensure a more precise alignment.

A bore 24 is drilled in the center of the mounting plate and a mounting post 25 is welded in the bore. The post is essentially flush with the surface of the mounting plate lying against the pipe boss flange and extends axially in an opposite direction through the mounting plate. The mounting post is shaped with an internal annular shoulder 26 which functionally cooperates with an expandable holding sleeve unit 13.

The expandable holding sleeve unit is configured to engage the inside of the pipe when the disk-shaped mounting plate abuts the exposed surface of the flange. A draw bolt 27 axially extends through the length of the mounting post and well into the pipe. A nut and washer combination 28 rests on annular shoulder 26 and at the opposite end of the draw bolt a flared portion 29 contacts a plurality of blade inserts 30.

Figure 4:
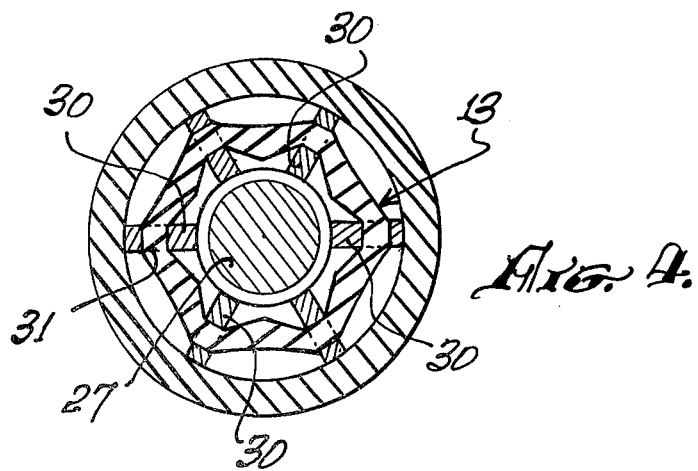
FIG. 4 is a cross sectional view of a detail of the invention taken generally along lines 4—4 in FIG. 1.

Referring to FIG. 4, the six blade inserts are arranged in a side-by-side relationship to roughly define a cylinder. They are held in this shape by a molded rubber retainer 31 that positions the blades so that they radially extend from an imaginary axis running the length of the holding sleeve unit.

At the opposite end of the blade inserts a cylinder expander 33 rests on the blade inserts. With this combination of elements in the holding sleeve unit, tightening nut 28 draws flared portion 29 of draw bolt 27 toward the nut. The blade inserts simultaneously are cammed radially outwardly by the flared portion and by expander 33. The outwardmost surfaces of the blade inserts are forcefully pressed against the inside of the pipe. Continued tightening of nut 28 assures a secure interconnection to the pipe boss flange. A final adjustment of four set screws 21 assures a precise disposition of the mounting plate on the flange.

Perpendicular orientation of drive unit 16 with respect to the predetermined positioning of the mounting plate is guaranteed by the rotatable bracket 14, otherwise identified as being the rotatably engaging means.

A flat portion 40 is bolted onto a split clamp 41. When the clamp is tightened by a locking screw 42 and when its associated handle 42' is tightened, the split clamp 41 firmly grips mounting post 25. A leg section extending from flat portion 40 is provided with a foot 43 which lies in an arc concentric with the circumference of the mounting plate. This location places the foot on the mounting plate near its edge. This gives the rotatable bracket a longer lever arm and provides greater stability to the other units of the drilling machine.

A plurality of oblong holes 44 is machined at the opposite end of the bracket on an extension of the flat portion for receiving four socket head screws. The screws are inserted through these holes and mates with the tapped-through holes provided on the backside of saddle 50. The eight oblong holes receive the cap screws to allow precise positioning of vertical feed and traverse mechanism 15 in either of two positions parallel with mounting plate 20. The two positions correspond to a lateral alignment of drive unit 16 with the drill guide holes 22' and the drill guide holes 22". The two sets of drill guide holes are on different common bolt circles which would correspond to the hole locations on two different sized pipe boss flanges. Obviously, differently shaped flanges would dictate that the guide holes be disposed accordingly.

Running parallel with the two rows of oblong holes, a key slot 46 is machined in the flat portion. The slot reaches across a saddle 50 and provides support and guidance for vertical feed and traverse mechanism 15.

As mentioned before, the vertical feed and traverse mechanism is connected to flat portion 40 of the rotatable bracket 14 by screws 15 via a saddle 50. In addition to the screws fastening the saddle and flat portion together a lateral key square 51 fits into key slot 46 to allow the saddle to move parallel to the mounting plate as the screws are repositioned. Irrespective of which holes receive the screws the slot ensures that the entire unit is perpendicular to the mounting plate and flange.

The elongate saddle is shaped with a flat back and flat sides and a pair of machined projections 50a run its entire length to form a dove-tailed mortised face. The dove-tail mortise is dimensioned to receive dove-tailed tennons 52a of a slide 52. A sufficient clearance between the dove-tail mortise and the dove-tail tenons allows the slide to move perpendicularly from the mounting plate in the saddle. This movement enables lowering or aising of machine drive unit 16.

The face 52b of the slide has rounded surface to conform to the outer dimensions of the drive unit. A cap 53 also has an internally rounded shape to hold the drive unit in place. Screws reach through the cap and into threaded holes on the slide to assure that the drive unit is firmly secured.

A notch 53a is cut on the side of the slide for receiving a lead screw nut 54. The lead screw nut is retained in the slide notch and a threaded bore 54a in the lead screw nut 54 is sized to mechanically coact with an elongate lead screw 55.

When the lead screw nut 54 is fitted on lead screw 55, rotation of the lead screw imparts perpendicular motion to the slide, cap and drive unit. The lead screw extends nearly the entire length of the slide and its lower end rests on a lead screw bearing 56 which is screwed onto saddle 50.

The mode machine drive unit 16 is perpendicularly displaced by rotating lead screw 55 via a gear mechanism 57. Mechanically cooperating helical gears, gear 58 mounted on the lead screw and a helical gear 59, transmit rotary force and motion to the lead screw when a three handled feed lever 60 is turned. Elaboration on the composition of the gear mechanism is dispensed with at this point, there being a wide variety of such mechanisms available within the state of the art and obvious to the routineer machinist.

In operation the invention quickly demonstrates its versatility and simplicity of operation. In a hard to reach location or otherwise inaccessible place a workman inserts the collapsed expandable holding sleeve unit 13 in the throat of a pipe. Mounting unit 12 is brought to bear against pipe boss flange 11 at which time nut 28 is tightened. The draw bolt 27 forces the blade inserts radially outwardly to firmly engage the inside of the pipe after the workman has rotated the mounting plate 20 so that its drill guide holes are properly located on the flange.

Once the pipe has been gripped by the holding sleeve unit and the drill guide holes have been properly located, a workman checks or repositions the bracket to make sure that screws 45 are in the proper set of oblong holes 44 to align machine drive unit 16 properly. This being done, feed lever 60 is rotated and the cutting tool driven by the machine drive unit is brought toward the surface of the mounting plate. Continued rotation of the feed lever pushes the cutting tool through a bushing 23 in a drill guide hole 22' or 22".

Continued rotation of the feed lever brings the cutting tool in contact with the pipe boss flange and a perfectly aligned hole is bored in the flange. A similar direction of the cutting tool ensues if threads are to be cut in a smooth bore or if existing threads need to be refurbished. When boring or tapping is finished, the tool is withdrawn from the flange and split clamp 41 is loosened to release its gripping force on mounting post 25 as the locking screw 42 is backed off. The rotatable bracket 14 is turned to position the cutting tool of the machine unit in line with another guide bushing and locking screw 42 is once again tightened and care is assured that foot portion 43 is positioned to firmly rest on the surface of the mounting plate. The feed lever 60 cranks the motor driven drill assembly to the flange and once again another perfectly aligned hole is bored in the pipe boss flange.

The foregoing steps are repeated until the job is finished. When finished, nut 28 is loosened and the drilling machine is taken from the pipe boss flange to another. No ancillary supportive equipment need be disassembled or reassembled and job efficiency is raised.

Obviously, many modifications and variations of the present invention are possible in the light of the above teachings, and, it is therefore understood that within the scope of the disclosed inventive concept, the invention may be practiced otherwise than as specifically described.

We claim:

1. An apparatus for drilling holes in a pipe boss flange comprising:
    a disk shaped mounting plate provided with a concentric projection having an axial bore and shaped for abutting the surface of the pipe boss flange having a plurality of openings therethrough;
    means including a plurality of blades arranged in a cylinder with their longitudinal axis being mutually parallel, a resilient element bonding the blades together in their cylindrical configuration and a drawbolt-expander mechanism disposed to radially displace the blades against the inner surface of the pipe to secure the abutting mounting plate thereon and being and reaching through the axial bore of the mounting plate and sized to fit within the pipe for expanding when inserted therein to be secured on one side of the mounting plate;
    means including a split clamp that clamps onto the concentric projection to arrest further rotational motion when the boring means is aligned with an opening on the mounting plate and an extension is provided with an elongate foot held on the surface of the mounting plate near its periphery for further assuring the perpendicular attitude therefrom and being carried on the concentric projection on the other side of the mounting plate having the extension for rotatably engaging the mounting plate to maintain a perpendicular attitude therefrom;
    means mounted on the engaging means for effecting parallel and perpendicular displacements with respect to the surface of the pipe boss flange;
    means mounted on the effecting means for boring aligned holes in the pipe boss flange after the engaging means and the effecting means have aligned the boring means with the openings in the mounting plate;
    means carried about the periphery of the mounting plate for aligning it with the surface of the pipe boss flange; and
    means disposed in each of the openings of the mounting plate for guiding the boring means into the surface of the pipe boss flange.

2. An apparatus according to claim 1 in which the effecting means includes a dovetailed slide mechanism mechanically coupled to the engaging means to effect the perpendicular displacements and several screws selectively engaging slots to ensure such perpendicular displacements of the effecting means.

3. An apparatus according to claim 2 in which the boring means is a motor driven drill assembly provided with suitable drills and taps for boring and threading holes in the pipe boss flange.

4. An apparatus according to claim 3 in which the aligning means is a four cap screws mounted in quadrature about the periphery of the disk shaped mounting plate being adjustable to effect the adjustment of the abutting means.

5. An apparatus according to claim 4 in which the guiding means is a bushing fitted into each opening in the disk shaped mounting plate.

* * * * *